June 16, 1964 R. W. BUETOW 3,137,605
THERMOGRAPHIC METHOD FOR MARKING PHOTOGRAPHS
Filed Feb. 4, 1960
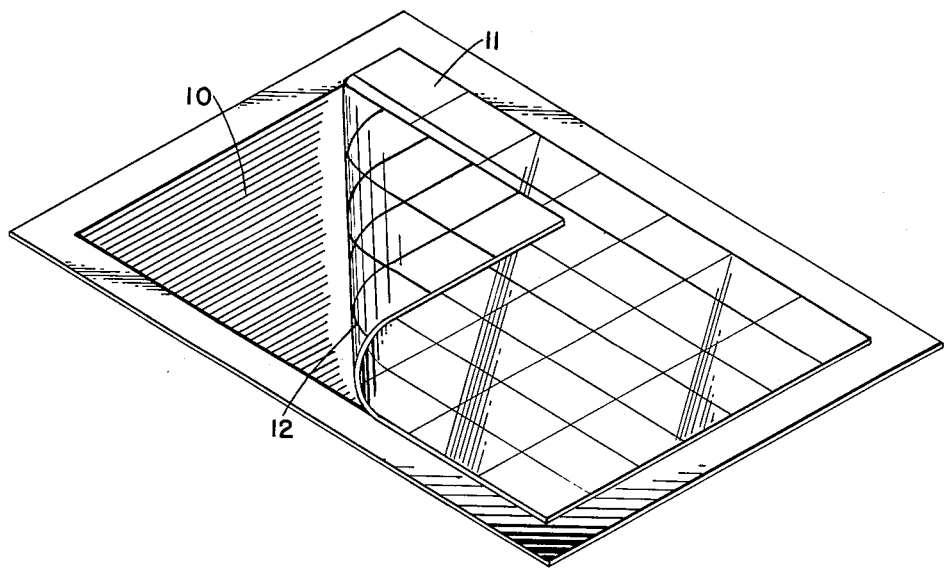
FIG. I
INVENTOR
RALPH W. BUETOW
BY *H. Keith Schoff*
ATTORNEY

United States Patent Office 3,137,605
Patented June 16, 1964

3,137,605
THERMOGRAPHIC METHOD FOR MARKING PHOTOGRAPHS
Ralph W. Buetow, Madison, Wis., assignor, by mesne assignments, to the United States of America as represented by the Secretary of the Army
Filed Feb. 4, 1960, Ser. No. 6,680
2 Claims. (Cl. 156—240)

This invention relates to a method of marking photographic prints and glass diapositives, and more particularly relates to a method of marking photographs by causing a heat sensitive composition to be transferred from a carrier film to a photograph. Transfer of a composition in accordance with this invention may be effected by exposing a carrier film to radiant or conducted heat while the film is in contact with a photograph.

Photographs which are to be preserved in unmutilated condition may desirably be marked with descriptive and reference material to facilitate identification and interpretation. The process of this invention provides a non-mutilative photograph marking method.

It is an object of this invention to provide a method for non-destructively marking photographs.

It is another object of this invention to provide durable and removable compositions for marking photographs.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a perspective view of a transfer film superimposed on a photograph to be marked.

In FIGURE 1 is shown a photographic print 10 with transparent transfer film 11 placed thereon. Grid marking lines 12 are comprised of a fusible material adhered to film 11 and transferable to photograph 10 by heating of film 11 when film 11 is in contact with photograph 10. When heated the fusible material which comprises lines 12 is softened sufficiently to separate from the underside of film 11 and adhere to photograph 10. The transfer process is completed when the material cools and is tack free.

In the preferred embodiment of this invention film 11 is comprised of a transparent heat resistant film such as "Mylar" (trademark, E. I. du Pont de Nemours and Co. for polyethylene terephthalate) and the fusible composition comprising lines 12 is 60% gelatin and 40% sorbitol. The sorbitol serves as a solid plasticizer for gelatin and renders the composition non-tacky at ambient temperatures. It may be preferred to incorporate into the material comprising lines 12 a suitable dye, pigment or a combination of dyes and pigments.

The invention is further illustrated by the following examples which illustrate certain embodiments but are not to be taken as limiting the invention only to those particular embodiments illustrated, it being understood that other embodiments and equivalents will be apparent to those skilled in the art.

Example I

A composition comprising 23 parts of gelatin, 12 parts of sorbitol, 10 parts of titanium dioxide powder and 1 part of picric acid was mixed with 36 parts of ethylene glycol. The composition was heated to fluidity and was drawn from an orifice in a mixing vessel onto a transparent "Mylar" film into an arrangement of rectangular coordinates. After the composition was cooled and set the film was placed into contact with an aerial photograph with the deposited composition between. An electric iron heated to 200° F. was passed over the film. Transfer of the fusible composition was effected and continuous brilliant yellow lines which were firmly adherent and non-tacky after cooling to ambient temperatures resulted.

Example II

The procedure of Example I was repeated using 15 parts of gelatin and 21 parts of sorbitol in 24 parts of ethylene glycol. Brilliant yellow lines were obtained.

Example III

The procedure of Example I was repeated using 6% Rubber Red pigment (Brooklyn Color Works) in place of picric acid and 2 parts instead of 12 parts of sorbitol. Titanium dioxide improved filament formation and enabled lines of 0.7 mil width to be obtained. The composition was deposited on a 1 mil "Mylar" film by use of a hypodermic needle and was heated by using an electrically heated glass cover pressed against the transfer sheet for 15 seconds. A brilliant red line was obtained.

Other common pigments may be used with this invention or may be used in conjunction with various dyes.

Sorbitol is a preferred plasticizer, but polyethylene glycol 200 (trademark, Union Carbide and Carbon Corporation), lactic acid of 85% to 90% concentration, and glycerin were also used succesfully when not more than a few hours elapsed between deposition of the composition on the carrier film and sealing of the marking on a photograph. However the volatile nature of liquid plasticizers is not conducive to good shelf life of the compositions.

The shelf life of compositions containing solid plasticizers such as d-sorbitol is indefinite and such materials are suitable for use for extended periods of time. The preferred ratio of ethylene glycol to sorbitol is from 1:2 to 1:4.

Use of titanium dioxide enables filaments of attenuated thickness to be drawn. Breakage of such filaments is reduced by the use of pigment and the contrast of the marking means on the photograph is increased when pigment is used.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:
1. A process for applying non-permanent indicia to articles of graphic art comprising the steps of:
    (a) extruding onto one surface of a transparent, heat resistant, non-absorbent film, indicia in the form of a pattern having substantial portions free of said indicia; said indicia consisting of a fusible composition consisting essentially of 25% to 38% gelatin, 62% to 75% plasticizer and sufficient pigment to make said indicia clearly visible; said plasticizer being selected from the group consisting of sorbitol, ethylene glycol and mixtures thereof having a ratio by weight of sorbitol to ethylene glycol from 2:1 to 4:1;
    (b) aligning said transparent carrier sheet over an article of graphic art having a non-absorbent surface, said surface of said carrier sheet being in contact with the non-absorbent surface or the article of graphic art;
    (c) applying heat to said carrier sheet sufficient to fuse said indicia; and
    (d) removing the carrier sheet, said indicia having been transferred to the article of graphic art.

2. A transfer sheet for applying non-permanent markings to an article of graphic art comprising a transparent, heat resistant, non-absorbent film having, on one surface thereof, indicia in the form of a pattern having substantial portions free of said indicia; said indicia consisting of a fusible composition consisting essentially of 25% to 38% gelatin, 62% to 75% plasticizer and sufficient pigment to make said indicia clearly visible; said plasticizer being selected from the group consisting of sorbitol, ethylene glycol and mixtures thereof having a ratio by weight of sorbitol to ethylene glycol from 2:1 to 4:1.

References Cited in the file of this patent

UNITED STATES PATENTS

| | | |
|---|---|---|
| 1,750,754 | Haskins | Mar. 18, 1930 |
| 1,966,942 | Atkinson | June 17, 1934 |
| 2,121,126 | Harrison | June 21, 1938 |
| 2,121,131 | Power | June 21, 1938 |
| 2,255,912 | Champion | Sept. 16, 1941 |
| 2,596,754 | Yackel | May 13, 1952 |
| 2,600,388 | Beckel et al. | June 17, 1952 |

FOREIGN PATENTS

| | | |
|---|---|---|
| 205,398 | Australia | May 17, 1956 |